United States Patent [19]

Bacso et al.

[11] 3,852,312

[45] Dec. 3, 1974

[54] PREPARATION OF MANNICH BASES

[75] Inventors: Imre Bacso, Morristown; George A. Cooke, Denville, both of N.J.

[73] Assignee: Sandoz-Wander, Inc., Hanover, N.J.

[22] Filed: Jan. 15, 1973

[21] Appl. No.: 323,410

Related U.S. Application Data

[63] Continuation-in-part of Ser. No. 162,000, July 12, 1971.

[52] U.S. Cl....... 260/397.4, 260/397.5, 260/397.45, 260/239.55, 260/239.5, 424/243, 424/242
[51] Int. Cl.................... C07c 169/08, C07c 169/20
[58] Field of Search.......... 260/239.5, 239.55, 397.5

Primary Examiner—Elbert L. Roberts
Attorney, Agent, or Firm—Gerald D. Sharkin; Richard E. Vila; Frederick H. Weinfeldt

[57] ABSTRACT

Steroidal Mannich bases are prepared by reaction of a steroid bearing an ethynyl and a hydroxy function at any of positions 3 and 17 (or 17a) with an N,N-dialkyl substituted-amino-methanol in the presence of a monovalent coinage metal ion source, e.g., cuprous chloride. The compounds are useful as pharmaceuticals and as chemical intermediates.

26 Claims, No Drawings

PREPARATION OF MANNICH BASES

This is a continuation-in-part of copending application Ser. No. 162,000 filed July 12, 1971.

This invention relates to the preparation of Mannich bases and more particularly to the preparation of steroidal Mannich bases.

Heretofore, in carrying out Mannich reactions, an acid catalyst was employed, thus permitting competing reactions of other functionalities on the steroidal nucleus. The conventional method of avoiding such competing reactions was to "block" or protect such active functionalities. An advantage of the process of the present invention is that it does not employ an acid catalyst for the preparation of Mannich bases of steroids, thus a blocking or the protection of active side groups is obviated.

According to this invention, there is provided a means of introducing into a steroid at any of the three and 17 carbon atoms (or 17a, where the steroid is a D-homosteroid), both a hydroxy function and a dialkylaminopropynyl radical; the dialkylaminopropynyl radical having the structure:

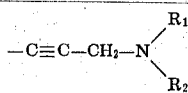

wherein $R^1$ independently represents hydrogen; lower alkyl having from one to four carbon atoms, e.g., methyl, ethyl, propyl and butyl; cycloalkyl of five to six ring members, such as cyclohexyl, cyclopentyl and lower-alkylated derivatives thereof, e.g., bearing a single alkyl group having from one to four carbon atoms; or phenyl lower alkyl; in which the alkyl radical has from one to four carbon atoms, and $R^2$ independently represents hydrogen, lower alkyl having from one to four carbon atoms, e.g., methyl, ethyl, propyl and butyl; lower alkanoyl having one to six carbon atoms, e.g., formyl, acetyl, propionyl, butyryl, isobutyryl and caproyl; cycloalkyl of five to six ring members, such as cyclopentyl, cyclohexyl and lower alkylated derivatives thereof, e.g., bearing a single alkyl group having fron one to four carbon atoms, e.g., 3-methylcyclopentyl or 4-ethylcyclohexyl; or phenyl lower alkyl in which the alkyl radical has from one to four carbon atoms, e.g., benzyl; or $R^1$ and $R^2$ together form $NR^1R^2$ and represent unsubstituted or lower alkylated piperidino, pyrrolidino, hexamethylenimino, morpholino or piperazino. There can be from one to three lower-alkyl groups containing from one to four carbon atoms. The lower alkyl groups are attached to carbon atoms except in the case of piperazino where the 4-nitrogen atom can also be alkylated.

The inventive concept lies in the introduction of the groups into the 3- and/or 17-(or 17a-) position of the steroid moiety and the exact nature of the steroid moiety itself is not critical to the invention. Preferred types of steroid moieties are those having from 18 to 23 carbon atoms not counting carbon content which may be provided by esterified hydroxy groups and by the omega-aminopropynyl chain, and having, e.g., the androstane (I), 19-nor-androstane (II), D-homestrane (III) or D-homoandostrane (IV) carbon skeletons.

The steroid moiety can contain varying degrees of unsaturation and a variety of substituents in the form of hydrocarbon radicals or functional groups conventionally employed in the steroid art, well known to impart hormonal or other endocrinological or pharmacological properties, as set forth in standard textbooks such as "Steroids" by Fieser and Fieser (Reinhold, 1959). The steroid moiety thus can have one or more substituents at various positions of the nucleus, taking into account the position already occupied by the amino-propynyl side chain, for example, hydroxy, mercapto or acyloxy at positions, 1,2,3,4,5,6,7,9, 11,12,14,15,16 or 17; oxo at positions 1,2,3,4,6,7,11,12, 15,16 or 17; acetyl, hydroxy acetyl, or 1-hydroxy ethyl at position 17; lower alkyl at positions 1,2,4,6,7,11,12, 16 or 17; or pyrazole or isoxazole rings fused to the 2-and 3-position, or to the 16- and 17- positions. The steroid moiety can also have one or more double bonds, especially at the 1,4,5,6, 9(10) and 9(11) positions. Compounds where ring A or both rings A and B are aromatic are also contemplated, in which event the amino-propynyl side chain can be present only at the 17 (or 17a) position.

Esterfied hydroxy steroids are included within the scope of this invention although the carbon content contributed by the acid moiety of the esters is not considered part of the essential carbon content of the steroid. When acyloxy radicals are present in the steroid moiety, the acyl radicals are preferably derived from carboxylic acids having from one to ten carbon atoms and molecular weights less than 200. Representative of the acyl radicals which can be present are lower alkanoyl, e.g., formyl, acetyl, propionyl, butyryl, isobutyryl, caproyl, heptanoyl, octanoyl, trimethylacetyl, and the like and acyloxy radicals containing a phenyl group. In acyl radicals containing a phenyl group, the latter can be unsubstituted or substituted by from one to three substituents inert under the reaction conditions used, including lower alkyl, lower alkoxy, halogen (including fluorine, chlorine, bromine and iodine) and nitro. Thus, the invention includes the preparation of steroids having in the 3 and/or the 17 position (or 17a)-position a hydroxy group and an omega-amino-1-lower-alkynyl wherein the steroid moiety has from 18 to 23 carbon atoms exclusive of ester radicals and of the omega-amine-1-lower alkynyl group and has the androstane, 19-nor-androstane, D-homoestrane or D-homoandrostane carbon skeleton, and wherein the amino portion of the amino-1-lower alkynyl group is of the formula $NR^1R^2$, wherein $R^1$ and $R^2$ are as defined above.

An embodiment of this invention is the preparation of compounds of formula I which may be shown structurally as follows:

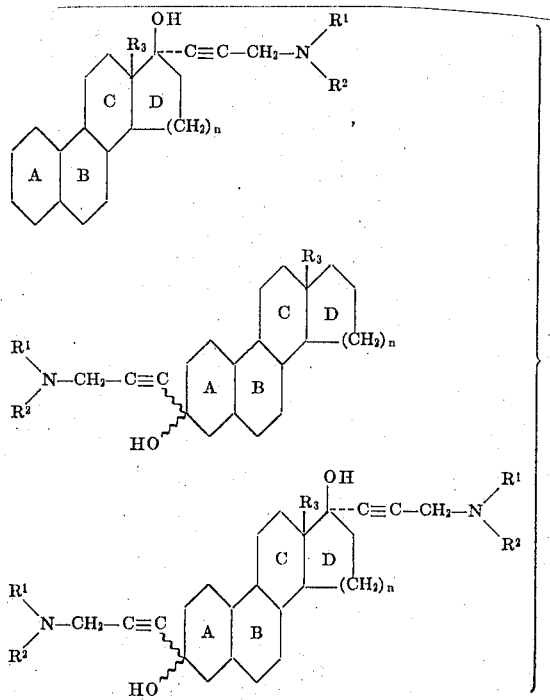

wherein the wavy lines indicate that the hydroxy and dialkylaminopropynyl substituents may be in the α or β relative positions; and where $n = 1$, or 2 and Rings A, B, C, and D represent a nucleus of steroidal nature, and $R^1$ and $R_2$ are as defined above; and $R^3$ is alkyl having from one to three carbon atoms.

The process of the present invention involves the reaction of a compound of the formula II with a compound of the formula III in the presence of a coinage metal monovalent ion and may be illustrated by the following reaction scheme wherein $n$, $R^1$, $R^2$ and $R^3$ are as defined above; and M is a coinage metal, i.e., copper, silver or gold.

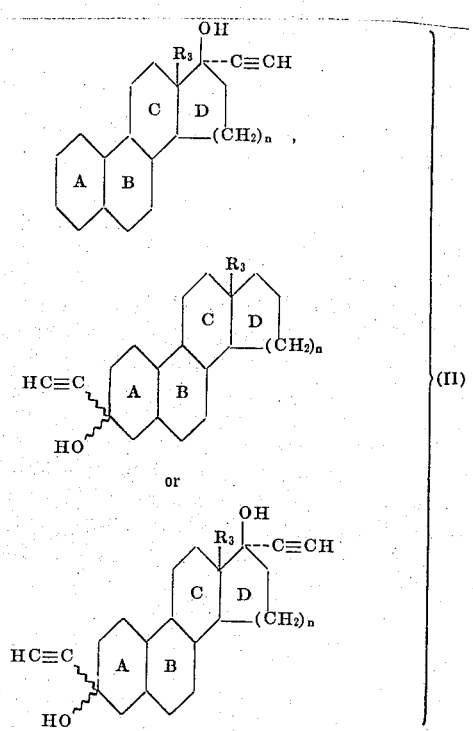

Products obtainable by the process of this invention, as represented by compounds of the formula (I) may be produced by reactively combining a corresponding steroid bearing at any of the 3- and 17- positions both a hydroxy function and an ethynyl radical, as represented by a compound of the formula (II), with a dialkylaminomethanol, i.e., a compound of the formula (III) in the presence of a monovalent coinage metal ion, preferably the cuprous ion. The process may be carried out at moderate temperatures, typically in the range of 20° to 80°C., preferably 20° to 30°C., thus eliminating competing reactions of other functional groups; known to react and form a Mannich-base under conventional Mannich-conditions. The reaction may be carried out in a suitable medium. Suitable media includes inert organic solvents such as the ethers, e.g., tetrahydrofuran, diethyl ether and p-dioxane, the latter being preferred. The reaction time may vary and although, not critical, one of the important advantages of this invention over the prior art is that applicants' process may be carried out in a considerably shorter period of time. In the process of the invention, cuprous salts, such as cuprous chloride, cuprous bromide, cuprous nitrate or cuprous acetate may be employed to provide cuprous ion, cuprous chloride being preferred. Generally, however, any source of copper (I) ions may be used. As examples of silver and gold salts, may be given silver or gold (I) chloride and bromide and silver nitrate. As examples of complexes of copper (I), silver and gold (I) may be given the cyanides thereof. Any source, e.g., salt, complex or adduct, may be employed which provides the monovalent metal ions under the reaction conditions. Recovery and purification of the final product may be effected in a conventional manner, e.g., crystallization or column chromatography.

In the above-described procedure, the starting materials are known and may be prepared by methods described in the literature or where not known may be prepared in a manner analogous to that described in the literature for preparing the known compounds; e.g., U.S. Pat. No. 3,522,243 and Belgian Pat. No. 742,137.

The above described compounds I wherein $R_3$ is methyl are useful as described in U.S. Pat. No. 3,522,243 as they possess useful cardio vascular properties. In particular they are active as coronary dilators and as cardiac antiaccelerators.

Particularly useful compounds obtainable by the process of this invention are compounds which are useful as intermediates in the preparation of 17$\beta$-hydroxy, 17$\alpha$-propadienyl bearing steroids described in the literature.

Thus, the compounds of formula Iaa,

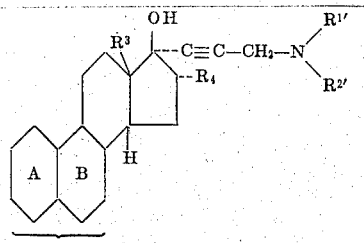

Iaa in which
  $R^3$ is as defined above,
  $R^4$ signifies hydrogen or an alkanoyloxy group of two to four carbon atoms,
  $R^{1\prime}$ and $R^{2\prime}$, which may be the same or different, each signifies an alkyl group of one to three carbon atoms, or
  $R^{1\prime}$ and $R^{2\prime}$, together with the nitrogen atom to which they are attached, signify a pyrrolidino, piperidino, homopiperidino or morpholino radical, and
  Z, embracing rings A and B and the substituents thereon, has the structure

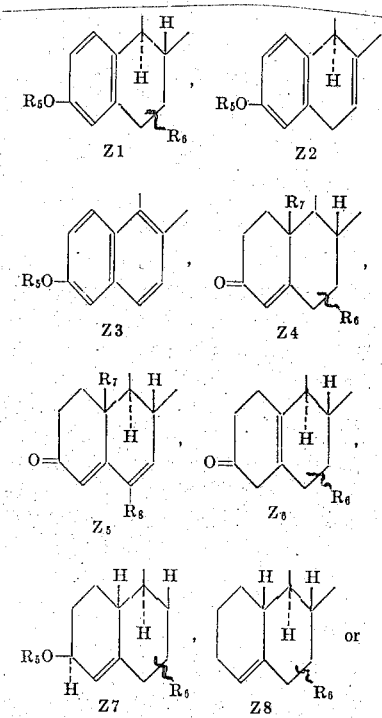

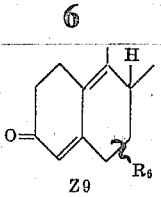

seven carbon atoms or an alkanoyl group of two to four carbon atoms,
  $R_6$ represents a hydrogen atom, or a 6$\alpha$-methyl group of a 7$\alpha$-methyl group,
  $R_7$ represents hydrogen or a methyl group, and
  $R_8$ represents hydrogen, halogen of atomic weight from 19 to 36, or a methyl group,
are useful as intermediates in preparing corresponding compounds bearing 17$\alpha$-propadienyl groups, by the method described in the Belgian Pat. No. 742,137 wherein the utility of such compounds is also disclosed. Compounds wherein rings A and B are represented by Z1, in which $R_6$ represents hydrogen and $R_5$ represents hydrogen or an alkanoyl group of two to four carbon atoms, are specifically excluded from said Belgian patent, but can be prepared analogously and are useful in the same manner as other compounds described therein where rings A and B represent Z1;

The compounds of formula Iab,

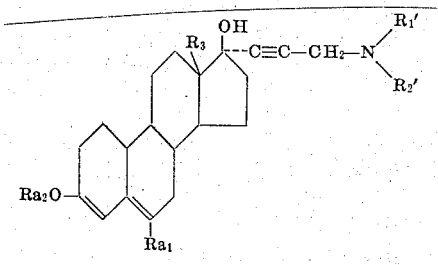

Iab in which
  $R_1{}'$, $R_2{}'$ and $R_3$ as defined above, Ra$_1$ signifies a hydrogen atom or a methyl radical, and
  Ra$_2$ signifies a cycloalkyl radical having from three to seven carbon atoms,
the compounds of formula Iac,

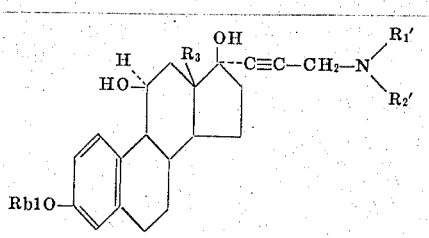

Iac in which
  $R_1{}'$, $R_2{}'$ and $R_3$ are as defined above, and
  Rb1 signifies an alkyl radical of one to four carbon atoms,
and the compounds of formula Iad,

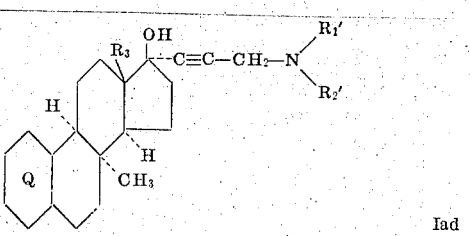

Iad in which
R₁', R₂' and R₃ are as defined above, and
ring Q, together with the substituents thereon, has structure

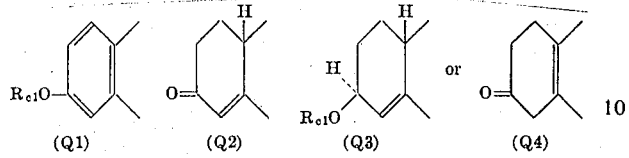

in which
$R_{cl}$ signifies a hydrogen atom, an alkyl radical of one to four carbon atoms or an alkanoyl radical of two to four carbon atoms, are useful as intermediates in the production of corresponding compounds bearing 17α-propadienyl groups which are described in Belgian Pat. No. 766,147.

The compounds of formula Iae,

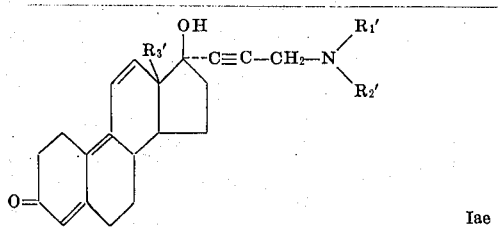

in which
R₁' and R₂' are as defined above, and
R₃' signifies a methyl, ethyl or n-propyl group are useful as intermediates in the production of corresponding compounds bearing 17α-propadienyl groups which are described in Belgian Pat. No. 766,148.

The compounds of formulae Iaf and Iag,

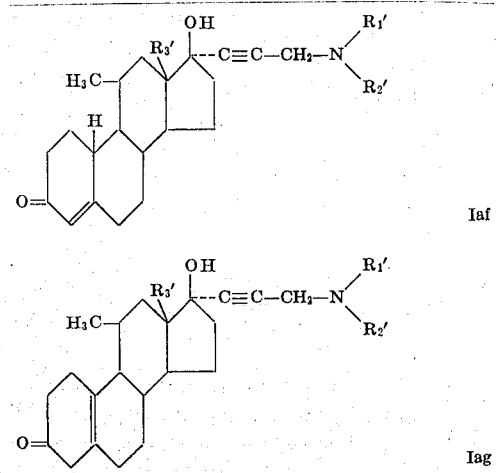

in which R₁', R₂' and R₃' are as defined above, are useful as intermediates in the production of corresponding compounds bearing 17α-propadienyl groups which are described in Belgian Pat. No. 767,430.

The compounds of formula Iah and Iai,

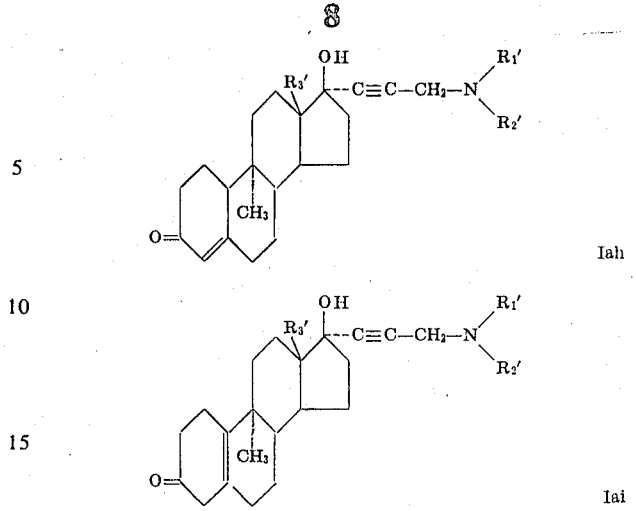

in which R₁', R₂' and R₃' are as defined above, are useful as intermediates in the production of corresponding compounds bearing 17α-propadienyl groups which are described in Belgian Pat. No. 767,431.

As will be appreciated by one skilled in the art, and as described in the above-mentioned Belgian patents, the above compounds Iaa to Iai may be used to obtain the 17α-propadienyl compounds; protected forms being employed where convenient. However, as is mentioned above, it is an advantage of the present invention that such protected forms need not be used when carrying out the process of this invention.

Accordingly, compounds obtainable by the practice of this invention include gonene steroids of formulae Iaa, Iab, Iac, Iad, Iae, Iaf, Iag, Iah and Iai.

Particularly useful compounds obtainable by the invention are gonene steroids of structure:

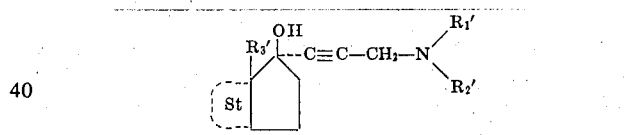

wherein R₁', R₂' and R₃' are as defined above, and St signifies a gonene residue of formula

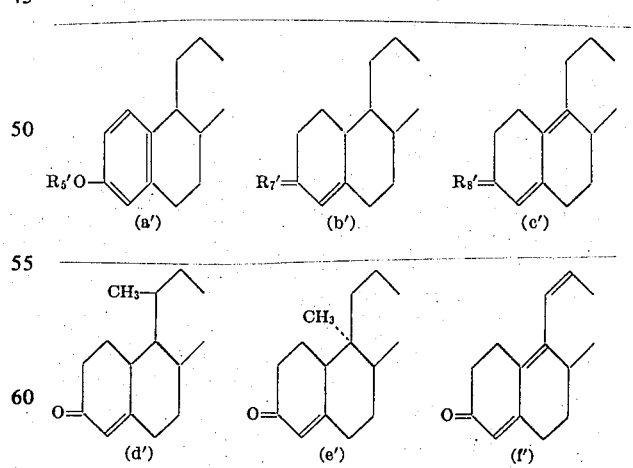

wherein
R₅' is a hydrogen atom, methyl or alkanoyl having from two to four carbon atoms, e.g., acetyl propionyl or n-butyl
R₇' is oxo or the group

and $R_8'$ is oxo,

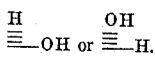

Particularly useful compounds in protected form obtainable by this invention are gonene steroids of the structure:

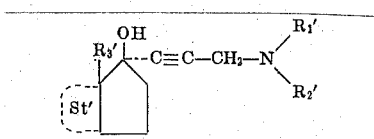

wherein $R_1'$, $R_2'$ and $R_3'$ are as defined above and St' signifies a gonene residue of the formula

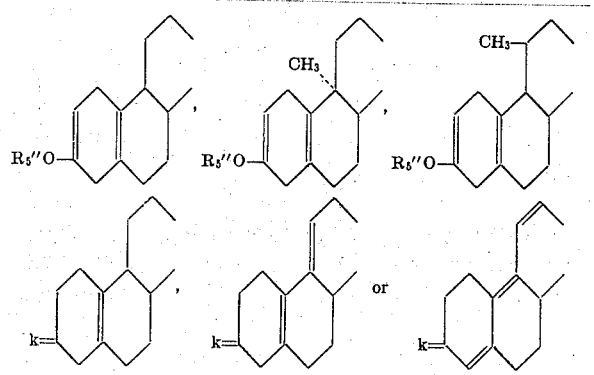

wherein $R_5''$ is lower alkyl, e.g., having from one to four linear carbon atoms, particularly methyl, tetrahydropyran-2-yl or tetrahydrofuran-2-yl, and $k$ is a ketal group of the structure

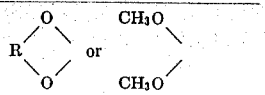

wherein R is an alkylene group having two or three carbon atoms, i.e., ethylene or propylene.

As noted above, it is a feature of this invention that the process is carried out in the absence of acid catalyst. The process is therefore carried out under nonacidic conditions. Such conditions may range from essentially neutral to moderately basic. Where any of the amino methanol reactant or the reaction product is basic, then the reaction mixture will be basic, having a pKb of, e.g., from about 7 to about 12 particularly from about 7.5 to about 10.

The invention is illustrated by the following Examples, in which all temperatures are in degrees centigrade and room temperature to 20° to 30°C., unless indicated otherwise.

EXAMPLE I

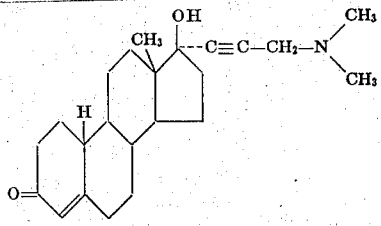

17α-[3'-(1'- dimethylamino-prop-2'-ynyl)]-estra-4-en-17β-ol-3-one.

1.0 of 17α-ethynyl-19-nor-testosterone is dissolved in 10 ml. p-dioxane and after adding 150 mgs. of CuCl the resulting suspension is stirred at room temperature for 5 minutes. Dimethylamino-methanol (1.5 ml.) is then added and the reaction mixture is stirred at room temperature for 30 minutes. The resulting solution is diluted with 90 ml. water and extracted three times with 20 ml. methylene chloride. The combined extracts are washed with water and after drying over anhydrous sodium sulfate, evaporated to dryness in vacuo. The residue is crystallized from acetone-hexane (5:1) to obtain the title compounds m.p. 121°–123°C.

Carrying out the procedure of this example, but replacing the 17α-ethynyl-19-nor-testosterone, i.e., 17α-ethynylestra-4-en-17β-ol-3-one, used herein with an equivalent amount of a. 17α-ethynyl-9α-methylestra-4-en-17β-ol-3-one,
b. 17α-ethynyl-11β-methylestra-4-en-17β-ol-3-one, or
c. 17α-[3'-(1'-dimethylamino-prop-2'-ynyl)]-8α-
there is similarly obtained
a. 17α-[3'-(1'-dimethylamino-prop-2'-ynyl)]-9α-methylestra-4-en-17β-ol-3-one,
b. 17α-[3'(1'-dimethylamino-prop-2'-ynyl)]-11β-methyl estra-4-en-17β-ol-3-one, and
c. 17α-[3'-(1'-dimethylamino-prop-2'-ynyl)]-8α-methylestra-4-en-17β-ol-3-one.

Carrying out the procedure of this example, but replacing the dimethylaminomethanol used herein with an equivalent amount of a. N-pyrrolidinocarbinol or
b. N-piperidinocarbinol there is similarly obtained
a. 17α-(3'-N-pyrrolidino-prop-1'-yn-1'-yl)-estra-4-en-17β-ol-3-one or
b. 17α-(3'-N-piperidino-prop-1'-yn-1'-yl)-estra-4-en-17β-ol-3-one.

EXAMPLE II

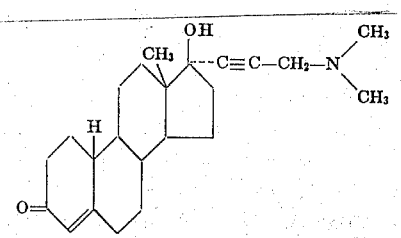

17α-[3'-(1'-dimethylamino-prop-2'-ynyl)]-estra-4,9(10)-dien-17β-ol-3-one.

3.0 g. of 17α-ethynylestra-4,9-dien-17β-ol-3-one is dissolved in 30 ml. p-dioxane and after adding 300 mgs. of CuCl, the resulting suspension is stirred at room temperature for 5 minutes. Dimethylamino-methanol (4.0 ml.) is then added and the mixture is stirred at room temperature for 15 minutes. The resulting solution is diluted with 250 ml. water and extracted three times with 50 ml. methylene chloride. The combined extracts are washed with water and after drying over anhydrous sodium sulfate, evaporated to dryness in vacuo. The residue is crystallized from acetone-hexane (5:1) to obtain the title compound m.p. 150°–152°C.

By repeating the procedure of this example, but using, in place of the cuprous chloride used therein, an approximately equivalent amount of silver nitrate, the title compound is obtained.

EXAMPLE III

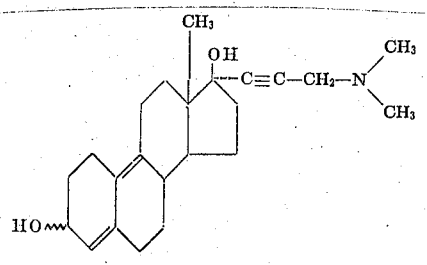

17α-[3'-(1'-dimethylamino-prop-2'-ynyl)]-estra-4,9(10)-dien-3,17β-diol.

25.0 g. of 17α-ethynylestra-4,9-dien-3,17β-diol is dissolved in 280 ml. p-dioxane and after adding 2.5 g. of CuCl, the suspension is stirred for 5 minutes at room temperature. Dimethylamino-methanol (37.0 ml.) is then added and the mixture is stirred at room temperature for 20 minutes. The resulting solution is diluted with 1.0 litre of water and extracted three times with 300 ml. methylene chloride. The combined extracts are washed with water and after drying over anhydrous sodium sulfate, evaporated to dryness in vacuo. The residue is crystallized from acetone to obtain the title compound.

Carrying out the procedure of this example, but replacing the 17α-ethynylestra-4,9-dien-3,17β-diol used herein with an equivalent amount of
  a. 17α-ethynylestra-4,9,11,-trien-17β-ol-3-one or
  b. 3,3-ethylenedioxy-17α-ethynylestra-4,9,11-trien-17β-ol
there is similarly obtained
  a. 17α-[3'-(1'-dimethylamino-prop-2'-ynyl)]-estra-4,9,11-trien-17β-ol-3-one and
  b. 3,3-ethylenedioxy-17α-[3'-(1'-dimethylamino-prop-2'-ynyl)]-estra-4,9,11-trien-17β-ol.

EXAMPLE IV

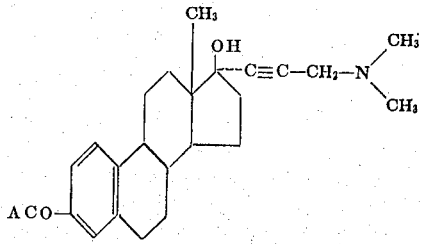

17α-[3'-(1'-dimethylamino-prop-2'-ynyl)]-estra-1,3,5(10)-trien-3,17β-diol-3-acetate.

4.5 g. of 3-acetoxy-17α-ethynylestra-1,3,5(10)-trien-17β-ol is dissolved in 45 ml. p-dioxane and after adding 300 mgs. of CuCl, the suspension is stirred at room temperature for 5 minutes. Dimethylamino-methanol (5.5 ml.) is then added and the mixture is stirred at room temperature for 15 minutes. The resulting solution is diluted with 300 ml. water and is extracted three times with 50 ml. methylene chloride. The combined extracts are washed with water and after drying over anhydrous sodium sulfate, evaporated to dryness in vacuo. The residue is crystallized from acetone-hexane (5:1) m.p. 122°–123°C.

EXAMPLE V

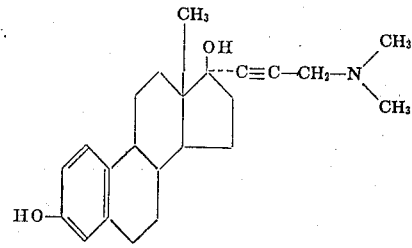

17α-[3'-(1'-dimethylamino-prop-2'-ynyl)]-estra-1,3,5(10)-dien-3,17β-diol.

1.0 g. of 17α-ethynyl-estradiol is dissolved in 10 ml. p-dioxane and after adding 100 mgs. of CuCl, the suspension is stirred at room temperature for 5 minutes. Diemthylaminomethanol (1.25 ml.) is then added and the mixture is stirred at room temperature. After 15 minutes crystals separate. The reaction mixture is diluted with 25 ml. water and the separated crystals are filtered, washed with water, and dried. Crystals are recrystallized from acetone, m.p. 203°–205°C.

EXAMPLE VI

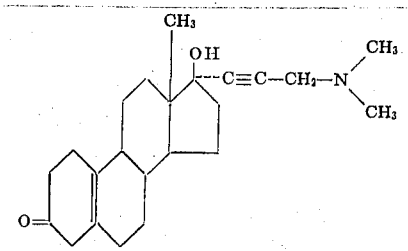

17α-[3'-(1'-dimethylamino-prop-2'-ynyl)]-estra-5(10)-en-17β-ol-3-one.

2.0 g. of 17α-ethynylestra-5(10)-en-17β-ol-3-one is dissolved in 20 ml. p-dioxane and after adding 300 mgs. of CuCl, the suspension is stirred at room temperature for 5 minutes. Dimethylamino-methanol (3.0 ml.) is then added and the mixture is stirred at room temperature for 20 minutes. The resulting solution is diluted with 150 ml. water and extracted three times with 50 ml. methylene chloride. The combined extracts are washed four times and after drying over anhydrous sodium sulfate, evaporated to dryness in vacuo to obtain the title compound.

Carrying out the procedure of this example, but replacing 17α-ethynylestra-5(10)-en-17β-ol-3-one used therein with an equivalent amount of
  a. 3,3-ethylenedioxy-17α-ethynylestra-5(10),9(11)-dien-17β-ol,
  b. 17α-ethynyl-3-methoxyestra-2,5(10)-dien-17β-ol, and
  c. 13-ethyl-17α-ethynylgona-4-en-17β-ol-3-one
there is similarly obtained
  a. 17α-[3'-(1'-dimethylamino-prop-2'-ynyl)]-3,3-ethylenedioxyestra-5(10),9(11)-dien-17β-ol,
  b. 17α-[(3'-(1'-dimethylamino-prop-2'-ynyl)]-3-methoxyestra-2,5(10)-dien-17β-ol, and
  c. 17α-[3'-(1'-dimethylamino-prop-2'-ynyl)]-13-ethylgona-4-en-17β-ol-3-one.

EXAMPLE VII

17α-[3'-(1'-dimethylamino-prop-2'-ynyl)]-estra-4-en-3β,17β-diol.

35 g. of 17α-ethynylestra-4-en-3 ,17β-diol is dissolved in 350 ml. of p-dioxane, and 3.5 g. of cuprous chloride, followed by 35 ml. of dimethylaminomethanol is added to the solution. The resulting mixture is stirred at room temperature for 1 hour, and is then diluted with 2.5 liters of water, resulting in separation of crystalline product which is recovered by filtration, and washed with water to obtain the title product, m.p. 93°–98°C.

What is claimed is:

1. A process for the preparation of a steroid having a carbon skeleton selected from the group consisting of androstane, and 19-nor-androstane, having both a β-hydroxy group and an α-omega-amino-1-propynyl group in the 17-position; wherein the steroid moiety has from 18 to 23 carbon atoms exclusive of ester radicals and of any omega-amino-1-propynyl group; and wherein the omega-amino group is of the formula $NR^1R^2$ wherein $R^1$ is a member of the group consisting of, alkyl having from one to four carbons, cycloalkyl of five to six ring members which may be unsubstituted or substituted by an alkyl having from one to four carbons and phenyl lower alkyl in which the alkyl has from one to four carbons, and $R^2$ is a member of the group consisting of, alkyl having from one to four carbons, cycloalkyl of five to six ring members which may be unsubstituted or substituted by an alkyl having from one to four carbons and phenyl lower alkyl in which the alkyl has from one to four carbons including compounds wherein $NR^1R^2$ together is a member of the group consisting of unsubstituted piperidino, pyrrolidino, hexamethylenimino, morpholino, piperazino, and lower-alkylated piperidino, pyrrolidino, hexamethylenimino, morpholino and piperazino substituted with from one to three alkyl groups containing from one to four carbons, which comprises reacting a corresponding steroidal compound bearing at the 17-position both a β-hydroxy group and an α-ethynyl group, with a compound of the formula

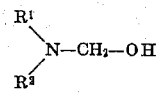

wherein $NR^1R^2$ is as previously defined, in the presence of a monovalent coinage metal ion and in the absence of an acid catalyst at a temperature of from 20° to 80°C.

2. A process according to claim 1 in which the coinage metal ion is the cuprous (I) ion.

3. A process according to claim 1 wherein the cuprous (I) ion is cuprous chloride.

4. A process according to claim 3 wherein the reaction is carried out at 20°C. to 30°C.

5. A process according to claim 3 which comprises reacting a 17α-ethynyl-19-nor-testosterone with dimethylamino-methanol in the presence of cuprous chloride producing 17α-[3'-(1'-dimethylamino-prop-2'-ynyl)]-estra-4-en-17β-ol-3-one.

6. A process according to claim 3 which comprises reacting 17α-ethynyl-estradiol with dimethylamino-methanol in the presence of cuprous chloride producing 17α-[3'(1'-dimethylamino-prop-2'-ynyl)]-estra-1,3,5(10)-trien-3,17β-diol.

7. A process according to claim 3 which comprises reacting a 17α-ethynylestra-4,9-dien-17β-ol-3-one with dimethylamino-methanol in the presence of cuprous chloride producing 17α-[3'-(1'-dimethylamino-prop-2'-ynyl)]-estra-4,9(10)-dien-17β-ol-3-one.

8. A process according to claim 3 which comprises reacting a 17α-ethynylestra-4,9-diene-3,17β-diol with dimethylamino-methanol in the presence of cuprous chloride producing 17α-[3'-(1'-dimethylamino-prop-2'-ynyl)]-estra-4,9(10)-dien-3,17β-diol.

9. A process according to claim 3 which comprises reacting a 3-acetoxy-17α-ethynyl estra-1,3,5(10)-trien-17β-ol with dimethylaminomethanol in the presence of cuprous chloride producing 17α-[3'-(1'-dimethylamino-prop-2'-ynyl)]-estra-1,3,5(10)-trien-3,17β-diol-3-acetate.

10. A process according to claim 3 which comprises reacting a 17α-ethynylestra-5(10)-en-17β-ol-3-one with dimethylamino-methanol in the presence of cuprous chloride producing 17α-[3'(1'-dimethylamino-prop-2'-ynyl)]-estra-5(10)-en-17β-ol-3-one.

11. A process for the preparation of a 17α-dialkaminopropynyl, 17β-hydroxy steroid having the formula

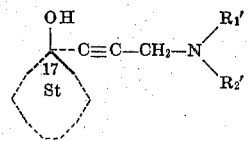

wherein
$R^{1\prime}$ and $R^{2\prime}$, which may be the same or different, each signifies an alkyl group of one to three carbon atoms, or
$R^{1\prime}$ and $R^{2\prime}$, together with the nitrogen atom to which they are attached, signify a pyrrolidino, piperidino, homopiperidino or morpholino radical,
and St is a steroidal residue of formula:

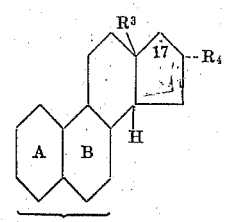

Iaa in which
$R^3$ is alkyl having from one to three carbon atoms,
$R^4$ signifies a hydrogen atom or an alkanoyloxy group of two to four carbon atoms,
Z, embracing rings A and B and the substituents thereon, has the structure

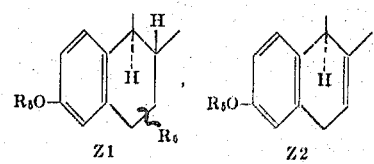

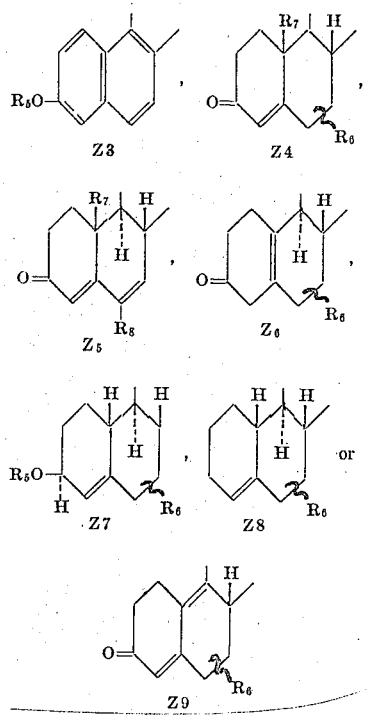

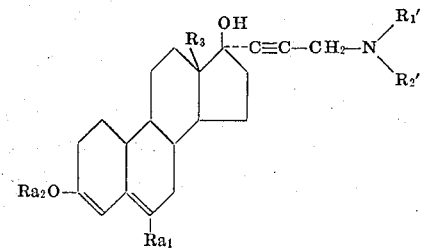

in which
R₅ signifies a hydrogen atom, and alkyl group of one to three carbon atoms, a cycloalkyl group of five to seven carbon atoms or an alkanoyl group of two to four carbon atoms,
R₆ represents a hydrogen atom, or a 6α-methyl group of a 7α-methyl group,
R₇ represents hydrogen or a methyl group, and
R₈ represents hydrogen, halogen of atomic weight from 19 to 36, or a methyl group;
or

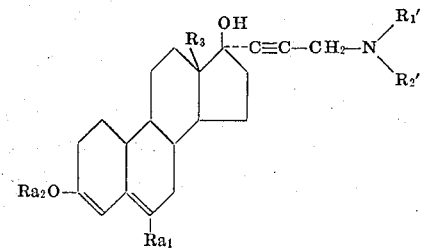

in which
R₃ is as defined above,
Ra₁ signifies a hydrogen atom or a methyl radical, and
Ra₂ signifies a cycloalkyl radical having from three to seven carbon atoms;

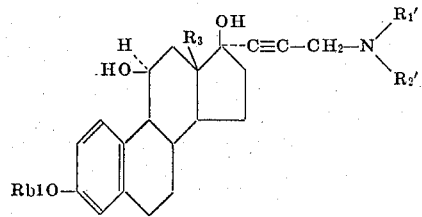

in which
R₃ is as defined above, and
Rb1 signifies an alkyl radical of one to four carbon atoms;

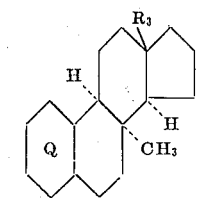

in which
R₃ is as defined above, and
ring Q, together with the substituents thereon, has structure

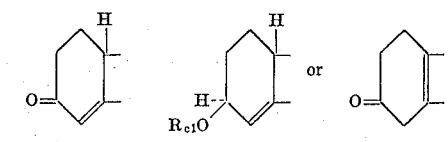

in which
R_cl signifies a hydrogen atom, an alkyl radical of one to four carbon atoms or an alkanoyl radical of two to four carbon atoms; or

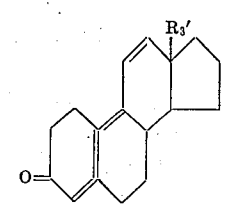

Iae,

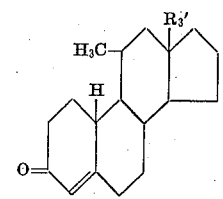

Iaf,

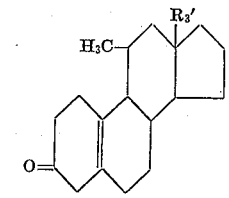

Iag,

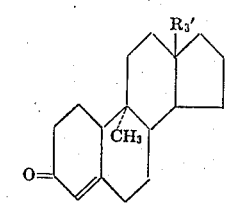

Iah, and

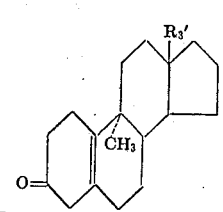

Iai in which
R$_3'$ signifies a methyl, ethyl or n-propyl group; which comprises reacting a 17α-ethynyl, 17β-hydroxy steroidal compound of the formula

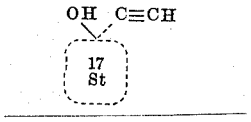

in which St is as defined above, with a dialkylamino compound of the formula

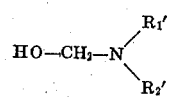

in which R$_1'$ and R$_2'$ are as defined above, in the presence of a monovalent coinage metal ion, and in the absence of an acidic catalyst at a temperature of from 20° to 80°C.

12. A process for the preparation of a compound of the

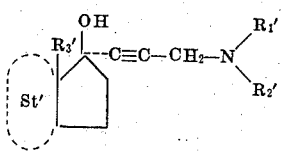

wherein
R$_1'$ and R$_2'$ which may be the same or different, each signifies an alkyl group of one to three carbon atoms, or
R$_1'$ and R$_2'$ together with the nitrogen atom to which they are attached, signify a pyrrolidino, piperidino, homopiperidino or morpholino radical,
R$_3'$ is methyl, ethyl or n-propyl, and
St' is a gonene residue of formula:

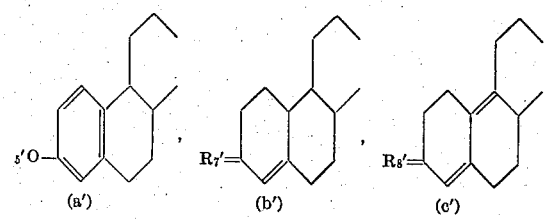

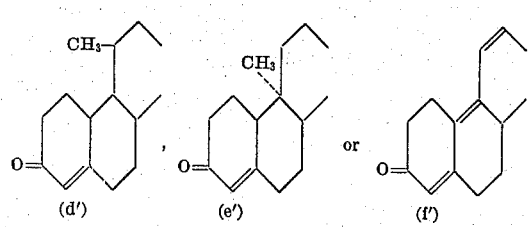

wherein
R$_5'$ is a hydrogen atom, methyl or alkanoyl having from two to four carbon atoms;
R$_7'$ is oxo or the group

and
R$_8'$ is oxo,

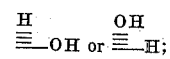

comprising reacting an intermediate of the formula

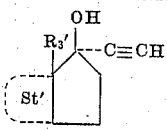

wherein
R$_3'$ and St' are as previously defined, with a dialkylamino compound of the formula

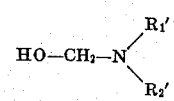

in which R$_1'$ and R$_2'$ are as previously defined, in the presence of a monvalent coinage metal ion, and in the absence of an acid catalyst, at a temperature of from 20° to 80°C.

13. A process of claim 12 in which the monovalent coinage metal ion is cuprous ion.

14. A process of claim 13 in which cuprous chloride is the source of the cuprous ion.

15. A process of claim 14 in which the temperature is from 20° to 30°C.

16. A process of claim 15 in which St' is of formula (a'), (b') or (c').

17. A process of claim 16 in which each of R$_1'$ and R$_2'$ is methyl.

18. A process of claim 17 in which R$_3'$ is methyl, R$_7'$ is

and st' is of formula (b').

19. A process for the preparation of a compound of the formula

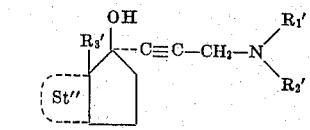

wherein
R$_1'$ and R$_2'$ which may be the same or different, each signifies an alkyl group of one to three carbon atoms, or
R$_1'$ and R$_2'$ together with the nitrogen atom to which they are attached, signify a pyrrolidino, piperidino, homopiperidino or morpholino radical,
R$_3'$ is methyl, ethyl or n-propyl, and
St'' is a gonene residue of formula:

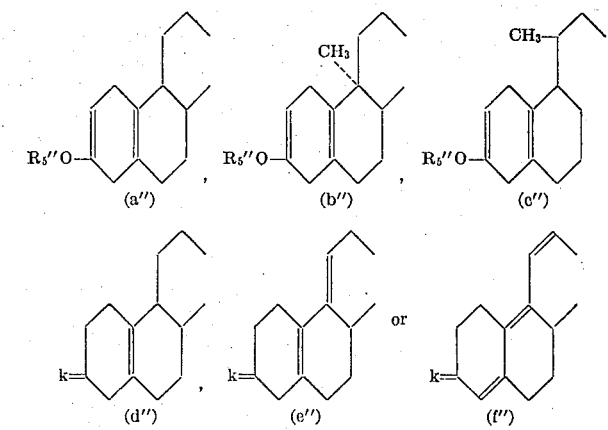

wherein $R_5''$ is alkyl, having from one to four linear carbon atoms, tetrahydropyran-2-yl or tetrahydrofuran-2-yl, and $k$ is a ketal group of the structure

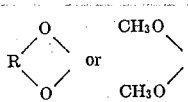

wherein R is an alkylene group having two or three carbon atoms, comprising reacting an intermediate of the formula

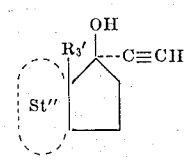

wherein $R_3'$ and $St''$ are as previously defined, with a dialkylamino compound of the formula

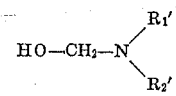

in which
$R_1'$ and $R_2'$ are as previously defined, in the presence of a monvalent coinage metal ion, and in the absence of an acid catalyst, at a temperature of from 20° to 80°C.

20. A process of claim 19 in which the monvalent coinage metal ion is cuprous ion.

21. A process of claim 20 in which cuprous chloride is the source of the cuprous ion.

22. A process of claim 21 in which the temperature is from 20° to 30°C.

23. A process of claim 22 in which $R_5''$ is methyl and R is ethylene.

24. A process of claim 23 in which St is of formula $(a'')$, $(b'')$ or $(c'')$.

25. A process of claim 24 in which each of $R_1'$ and $R_2'$ is methyl.

26. A process of claim 25 in which St is of formula $(a'')$.

* * * * *